(12) United States Patent
Namachivayam et al.

(10) Patent No.: US 12,066,923 B2
(45) Date of Patent: Aug. 20, 2024

(54) SYSTEMS AND METHODS FOR DETECTING FAILURES OF COMPUTER APPLICATIONS

(71) Applicant: Fidelity Information Services, LLC, Jacksonville, FL (US)

(72) Inventors: Venkatasubramanian Namachivayam, Tamil Nadu (IN); Shanmuga Priya Mariappan, Tamil Nadu (IN); Thirupathipandian Govindaraj, Tamil Nadu (IN); Krishna Kumar Jayendran, Tamil Nadu (IN); Santhosh Bs, Karnataka (IN); Naveen Chander Easwaramoorthy, Tamil Nadu (IN)

(73) Assignee: Fidelity Information Services, LLC, Jacksonville, FL (US)

( * ) Notice: Subject to any disclaimer, the term of this patent is extended or adjusted under 35 U.S.C. 154(b) by 157 days.

(21) Appl. No.: 17/592,958

(22) Filed: Feb. 4, 2022

(65) Prior Publication Data

US 2023/0195608 A1    Jun. 22, 2023

(30) Foreign Application Priority Data

Dec. 17, 2021   (IN) .............................. 202111059073

(51) Int. Cl.
G06F 11/36   (2006.01)

(52) U.S. Cl.
CPC ...... *G06F 11/3688* (2013.01); *G06F 11/3692* (2013.01)

(58) Field of Classification Search
CPC .............. G06F 11/3688; G06F 11/3692; G06F 11/3668
See application file for complete search history.

(56) References Cited

U.S. PATENT DOCUMENTS

| | | | |
|---|---|---|---|
| 11,704,229 B1 * | 7/2023 | Li .................... | G06F 11/3684 717/126 |
| 2011/0161395 A1 * | 6/2011 | O'Donnell, III .... | G06F 11/3414 714/39 |
| 2012/0123764 A1 * | 5/2012 | Ito ..................... | G06F 9/5055 703/21 |
| 2019/0303274 A1 * | 10/2019 | Funnell .............. | G06F 11/3696 |
| 2020/0089596 A1 * | 3/2020 | Barbee ............... | G06F 11/3006 |
| 2021/0382813 A1 * | 12/2021 | Moondhra ......... | G06F 11/3692 |
| 2022/0121560 A1 * | 4/2022 | Tetreault ............. | G06F 11/3664 |
| 2022/0261301 A1 * | 8/2022 | Philip ................ | G06F 11/3688 |
| 2023/0109114 A1 * | 4/2023 | Manikanta .......... | H04L 67/561 709/224 |

* cited by examiner

*Primary Examiner* — Yolanda L Wilson
(74) *Attorney, Agent, or Firm* — FINNEGAN, HENDERSON, FARABOW, GARRETT & DUNNER LLP

(57) ABSTRACT

Methods and systems for testing of at least one computer application include receiving from a user a monitoring request; selecting a script; performing at least one automation test with at least one automation application; requesting analytic data from at least one computer application; receiving analytic data associated with the at least one computer application; determining response data of the at least one computer application by inputting the analytic data to a comparison model determined based on an analysis technique configured to detect a failure by the at least one computer application; and generating a report based on an output of the analysis technique if the failure by the at least one computer application is detected.

17 Claims, 9 Drawing Sheets

SYSTEMS AND METHODS FOR DETECTING FAILURES OF COMPUTER APPLICATIONS

RELATED APPLICATIONS

This application claims priority to Indian Patent Application No. 202111059073 filed Dec. 17, 2021, which is hereby incorporated by reference in its entirety.

TECHNICAL FIELD

The present disclosure generally relates to computerized methods and systems for monitoring and testing of computer applications and, more particularly, to computerized methods and systems for detecting failures of computer applications to improve the overall performance of computer applications.

BACKGROUND

Many business providers (e.g., financial service provider) offer computer applications for their customers (e.g., merchants and banks) to interface with the business provider's products. Due to the nature of computerized services, a customer may experience errors and failures in using a business provider's computer application. Accordingly, a need exists to assist business providers in monitoring and detecting errors and failures experienced by customers using the business provider's computer applications.

Existing solutions require great effort (e.g., by a quality assurance team) for identifying and reviewing possible failures experienced by customers and writing the testing scripts for running testing schemes to determine whether a failure exists. Also, existing solutions require great effort to create and maintain program codes (e.g., scripts) and testing data for testing the computer application. Further, when the computer application has a change or a new function, existing solutions may require efforts to update and maintain the program codes and the testing data.

Existing solutions fail due to multiple reasons, including high costs, failure to simulate real customer transactions, and disruptive impact on both business providers and customers. Moreover, existing solutions also have technical problems because they are incapable of testing computer applications in production after environmental or code changes.

SUMMARY

One aspect of the present disclosure is directed to a system for testing of at least one computer application. The system includes a non-transitory computer-readable medium configured to store instructions and at least one processor configured to execute the instructions to perform operations. The operations include receiving from a user a monitoring request; selecting a script; performing at least one automation test with at least one automation application; requesting analytic data from the at least one computer application; receiving analytic data associated with the at least one computer application; determining response data of the at least one computer application by inputting the analytic data to a comparison model determined based on an analysis technique configured to detect a failure by the at least one computer application; and generating a report based on an output of the analysis technique if the failure by the at least one computer application is detected.

Other aspects of the present disclosure are directed to computer-implemented methods for performing the functions of the systems discussed above.

Other systems, methods, and computer-readable media are also discussed herein.

BRIEF DESCRIPTION OF THE DRAWINGS

FIG. 8$b$ is a flow diagram involving a testing module in the system shown in FIG. 1 for testing at least one computer application, consistent with embodiments of this disclosure.

DETAILED DESCRIPTION

Figure 1:
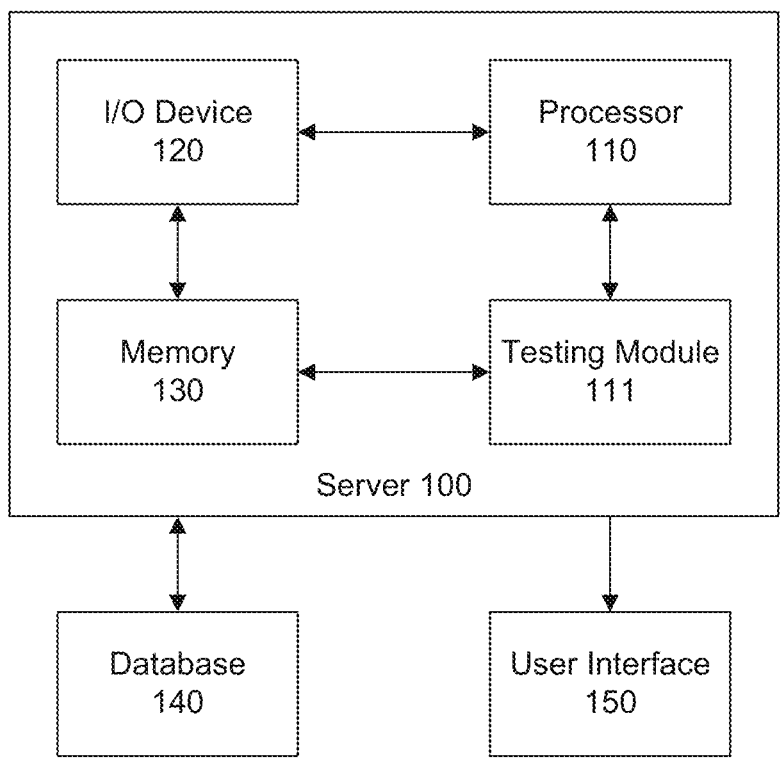
FIG. 1 is a diagram of an example server system for testing at least one computer application, consistent with embodiments of this disclosure.

The disclosed embodiments include systems and methods for monitoring and testing of computer applications. Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the accompanying drawings, are for the purpose of description and should not be regarded as limiting.

As such, those skilled in the art will appreciate that the conception upon which this disclosure is based may readily be utilized as a basis for designing other structures, methods, and systems for carrying out the several purposes of the present disclosure.

Reference will now be made in detail to the present example embodiments of the disclosure, examples of which are illustrated in the accompanying drawings. Wherever possible, the same reference numbers will be used throughout the drawings to refer to the same or like parts.

The solution presented, herein, relates to a system for testing at least one computer application. In one embodiment, the system generates a synthetic test to compare the synthetic test with actual data collected from a computer application. If for, example, the synthetic test and the actual data collected from the computer application match, the system will determine that no failures exist. However, in other embodiments, if the synthetic test and the actual data collected from the computer application do not match, the system will determine that a failure exists. In some embodiments, when a failure is detected, a report will be generated and transmitted to a system supervisor.

FIG. 1 is a block diagram of an example server computer system 100 (referred to as "server 100" hereinafter), consistent with some embodiments of this disclosure. Server 100 may be one or more computing devices configured to execute software instructions stored in memory to perform one or more processes consistent with some embodiments of this disclosure. For example, server 100 may include one or more memory devices for storing data and software instructions and one or more hardware processors to analyze the data and execute the software instructions to perform server-based functions and operations (e.g., back-end processes). The server-based functions and operations may include testing of a computer application.

In FIG. 1, server 100 includes a hardware processor 110, an input/output (I/O) device 120, and a memory 130. It should be noted that server 100 may include any number of those components and may further include any number of any other components. Server 100 may be standalone, or it may be part of a subsystem, which may be part of a larger system. For example, server 100 may represent distributed servers that are remotely located and communicate over a network.

Processor 110 may include one or more known processing devices, such as, for example, a microprocessor. In some embodiments, processor 110 may include any type of single or multi-core processor, mobile device microcontroller, central processing unit, or any circuitry that performs logic operations. In operation, processor 110 may execute computer instructions (e.g., program codes) and may perform functions in accordance with techniques described herein. Computer instructions may include routines, programs, objects, components, data structures, procedures, modules, and functions, which may perform particular processes described herein. In some embodiments, such instructions may be stored in memory 130, processor 110, or elsewhere.

I/O device 120 may be one or more devices configured to allow data to be received and/or transmitted by server 100. I/O device 120 may include one or more customer I/O devices and/or components, such as those associated with a keyboard, mouse, touchscreen, display, or any device for inputting or outputting data. I/O device 120 may also include one or more digital and/or analog communication devices that allow server 100 to communicate with other machines and devices, such as other components of server 100. I/O device 120 may also include interface hardware configured to receive input information and/or display or otherwise provide output information. For example, I/O device 120 may include a monitor configured to display a business provider interface. In yet another example, I/O device 120 may include a monitor configured to display a customer interface.

Memory 130 may include one or more storage devices configured to store instructions used by processor 110 to perform functions related to disclosed embodiments. For example, memory 130 may be configured with one or more software instructions associated with programs and/or data. Memory 130 may include a single program that performs the functions of the server 100, or multiple programs. Additionally, processor 110 may execute one or more programs located remotely from server 100. Memory 130 may also store data that may reflect any type of information in any format that the system may use to perform operations consistent with disclosed embodiments. Memory 130 may be a volatile or non-volatile (e.g., ROM, RAM, PROM, EPROM, EEPROM, flash memory, etc.), magnetic, semi-conductor, tape, optical, removable, non-removable, or another type of storage device or tangible (i.e., non-transitory) computer-readable medium. In some embodiments, memory 130 may be used to store information for a period of 30 days.

Consistent with some embodiments of this disclosure, server 100 includes a testing module 111. Testing module 111 may be configured to test at least one computer application. Testing module 111 may be implemented as software (e.g., program codes stored in memory 130), hardware (e.g., a specialized chip incorporated in or in communication with processor 110), or a combination of both. By way of example, testing module 111 may utilize Microsoft Azure™ or other cloud computing services (e.g., by communicating with such a cloud computer service over a network). Systems and methods of disclosed embodiments, however, are not limited to separate cloud computing services. Yet, in some embodiments, testing module 111 may rely on a cloud computing services to test computer applications from different geographic locations. In other embodiments, testing module 111 may rely on cloud computing services to assist in increasing the number of computer applications that may be tested at any given time. Furthermore, in some embodiments, testing module 111 may be integrated into any regression automation tool to test and/or monitor at least one computer application.

Server 100 may also be communicatively connected to one or more databases 140. For example, server 100 may be communicatively connected to database 140. Database 140 may be a database implemented in a computer system (e.g., a database server computer). Database 140 may include one or more memory devices that store information and are accessed and/or managed through server 100. By way of example, database 140 may include Microsoft SQL Server™, Oracle™, Sybase™ databases, or other relational databases or non-relational databases, such as Hadoop sequence files, HBase, or Cassandra. Systems and methods of disclosed embodiments, however, are not limited to separate databases. In one aspect, server 100 may include database 140. Alternatively, database 140 may be located remotely from the server 100. Database 140 may include computer components (e.g., database management system, database server, etc.) configured to receive and process requests for data stored in memory devices of database 140 and to provide data from database 140.

Server 100 may also be communicatively connected to one or more user interface 150. User interface 150 may include a graphical interface (e.g., a display panel), an audio interface (e.g., a speaker), or a haptic interface (e.g., a vibration motor). For example, the display panel may include a liquid crystal display (LCD), a light-emitting diode (LED), a plasma display, a projection, or any other type of display. The audio interface may include microphones, speakers, and/or audio input/outputs (e.g., headphone jacks). In some embodiments, user interface 150 may be included in server 100. In some embodiments, user interface 150 may be included in a separate computer system. User interface 150 may be configured to display data transmitted from server 100.

In connection with server 100 as shown and described in FIG. 1, the systems and methods as described herein may provide a technical solution to technical problems in testing computer applications. Aspects of this disclosure may relate to testing of at least one computer application, including systems, apparatuses, methods, and non-transitory computer-readable media. For ease of description, a system is described below, with the understanding that aspects to the system apply equally to methods, apparatuses, and non-transitory computer-readable media. For example, some aspects of such a system can be implemented by a system (e.g., server 100 and database 140), by an apparatus (e.g., server 100), as a method, or as program codes or computer instructions stored in a non-transitory computer-readable medium (e.g., memory 130 or another storage device of server 100). In a broadest sense, the system is not limited to any particular physical or electronic instrumentalities, but rather can be accomplished using many different instrumentalities.

Consistent with some embodiments of this disclosure, a system for testing at least one computer application may include a non-transitory computer-readable medium configured to store instructions and at least one processor configured to execute the instructions to perform operations. A computer application, as used herein, may refer to a set of computer programs or modules (e.g., application programming interfaces (APIs), websites, mobile applications, etc.). In some embodiments, the computer application may be created, maintained, updated, or executed at a server computer of the system.

By way of example, with reference to FIG. 1, the system may include server 100 and database 140. The at least one processor may be processor 110 in server 100. The non-transitory computer-readable medium may be memory 130 in server 100. The instructions stored in the non-transitory computer-readable medium may be used for implementing testing module 111 in server 100.

Consistent with some embodiments of this disclosure, the at least one processor of the system may perform operations of receiving from a user a monitoring request, selecting a script, performing at least one automation test with at least one automation application, requesting analytic data from at least one computer application, receiving analytic data associated with the at least one computer application, determining response data of the at least one computer application by inputting the analytic data to a comparison model determined based on an analysis technique configured to detect a failure by the at least one computer application, and/or generating a report based on an output of the analysis technique if the failure by the at least one computer application is detected. In other embodiments of this disclosure, the at least one processor of the system may perform operations of transmitting to the user the report if the failure by the at least one computer application is detected. In contrast, in other embodiments of this disclosure, the at least one processor of the system may perform operations of transmitting to the user the report if the failure by the at least one computer application is not detected.

Receiving a request and receiving data, as used herein, may refer to accepting, taking in, admitting, gaining, acquiring, retrieving, obtaining, reading, accessing, collection, or any operation for inputting data. In contrast, requesting data and transmitting a report, as used herein, may refer to any operation for outputting data. In some embodiments of the system, a monitoring request may be received at random time intervals. Likewise, in other embodiments, receiving analytic data may be received at random time intervals. In contrast, other embodiments may support a monitoring request and/or receiving analytic data at periodic scheduled time intervals (e.g., every fifteen minutes, every thirty minutes, or every sixty minutes).

The computer application, as used herein, may perform operations to implement features such as an API, a website, a mobile application, or any other type of user interface. Furthermore, the computer application, as used herein, may refer to data representing an output from a user device or a user interface, not limited to an API, a website, and a mobile application.

Consistent with some embodiments of this disclosure, the at least one processor of the system may perform operations of creating a script configured to simulate a feedback from the at least one computer application. In some embodiments, the script may be a synthetic script. In some embodiments, the at least one processor of the system may receiver a credential from the user. In some embodiments, the credential is encrypted.

Consistent with some embodiments of this disclosure, the at least one processor of the system may perform a first automation test and a second automation test simultaneously.

Figure 2:
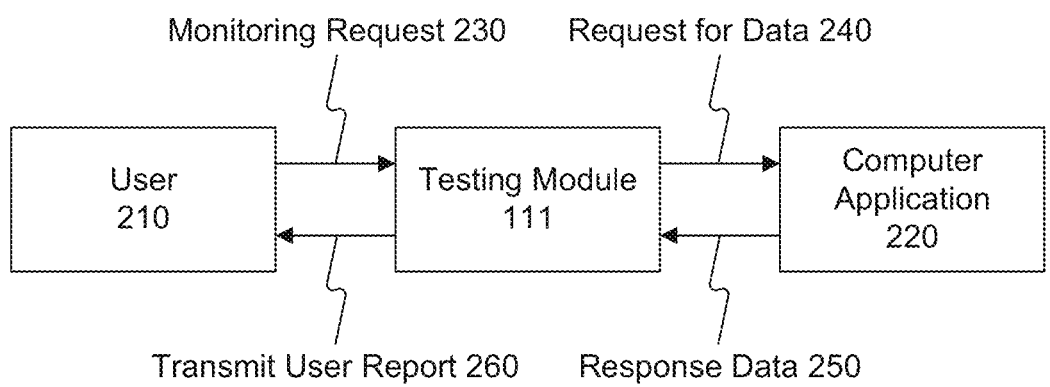
FIG. 2 is a diagram of an example system for testing at least one computer application, consistent with embodiments of this disclosure.

By way of example, FIG. 2 is a diagram of an example system for testing at least one computer application, consistent with embodiments of this disclosure.

Consistent with some embodiments of this disclosure, user 210 may represent a system owned or operated by an entity such as a financial service provider. In some embodiments, user 210 may be a computer operator which oversees the running and operation of computer application 220. In other embodiments, user 210 may monitor, control, respond to, or command computer application 220. In some embodiments, user 210 may represent a device or system used by a person associated with that entity, while in other embodiments, user 210 may represent the user using such a device or system.

Consistent with some embodiments of this disclosure, user 210 relies on testing module 111 to assist in overseeing monitoring or control of computer application 220. In other embodiments, testing module 111 assists user 210 is detecting errors and failures of computer application 220. For example, in one embodiment testing module 111 may be configured to be compatible with computer application 220 so as to transmit information or receive information. In other embodiments, testing module 111 may be modified to be compatible with uniform resource locators (URLs), pageloads, and APIs.

Consistent with some embodiments of this disclosure, computer application 220 may, for example, be a website, a web application, a mobile application, an API, or any other set of computer programs or modules.

In some embodiments, testing module 111 in FIG. 1 may receive monitoring request 230 from user 210. In some embodiments, monitoring request 230 may be any input of data requesting testing module 111 to monitor or perform tests relating to computer application 220. In some embodiments, monitoring request 230 is received by testing module 111 at random time intervals. In contrast, in other embodiments, monitoring request 230 is received by testing module 111 at periodic scheduled time intervals (e.g., every fifteen minutes, every thirty minutes, or every sixty minutes).

As illustrated in FIG. 2, in some embodiments, testing module 111 may send request for data 240 to computer application 220. In some embodiments request for data 240 is any output of data that requests data from computer application 220. The request for data 240, in some embodiments, is triggered when testing module 111 receives monitoring request 230. In other embodiments, testing module 111 randomly generates request for data 240 without receiving monitoring request 230. After generating request for data 240, testing module 111 may receive response data 250 from computer application 220. In some embodiments, receive response data 250 is any input of data. For example, receive response data 250 may input data containing information regarding computer application 220's response time or information regarding computer application 220's performance. After that, testing module 111 may, in some embodiments, transmit user report 260 to user 210. In some embodiments, transmit user report 260 is any output of data. For example, in some embodiments transmit user report 260 may output a user report that contains information regarding the status of computer application 220.

Figure 3:
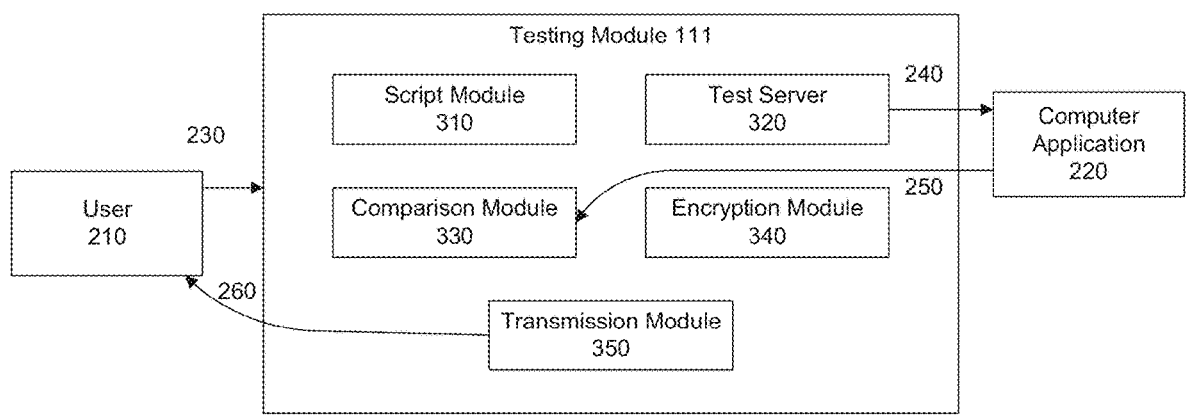
FIG. 3 is a diagram of an example structure of a system for testing at least one computer application, consistent with embodiments of this disclosure.

By way of example, FIG. 3 is a diagram of an example structure of a system for testing at least one computer application, consistent with embodiments of this disclosure. In some embodiments, testing module 111 in FIG. 1 may include script module 310, test server 320, comparison module 330, encryption module 340, and/or transmission module 350.

In some embodiments of this disclosure, testing module 111 in FIG. 1 receives from user 210 a monitoring request 230. Upon reception of the monitoring request 230, in some embodiments, script module 310 creates and selects a script to perform at least one automation test. In some embodiments, the script may be a synthetic script. For example, in some embodiments, script module 310 uses, at least in part, open-source software (e.g., Selenium) to create a script. Furthermore, in some embodiments, script module 310 uses, at least in part, open-source software (e.g., Selenium) to select a script to perform at least one automation test. When creating a script some embodiments use a functional automation testing framework (e.g., keyword driven framework) in combination with data files (e.g., Microsoft Excel).

Upon script module 310's completion of creating and selecting a script, in some embodiments, test server 320 executes the selected script to perform at least one automation test with at least one computer application 220 in FIG. 2. In some embodiments test server 320 may be a test module. As part of the at least one automation test with at least one computer application 220, in some embodiments, test server 320 requests analytic data, through request for data 240, from at least one computer application 220. Then, in some embodiments, testing module 111 receives response data 250 from at least one computer application 220. Upon reception of response data 250, in some embodiments, comparison module 330 inputs response data 250 into a comparison model determined based on an analysis technique configured to detect a failure by the at least one computer application 220. If a failure is detected, in some embodiments, transmission module 350 transmits user report 260 notifying user 210 of the failure, thereby enabling user 210 to cure the failure.

Figure 4:
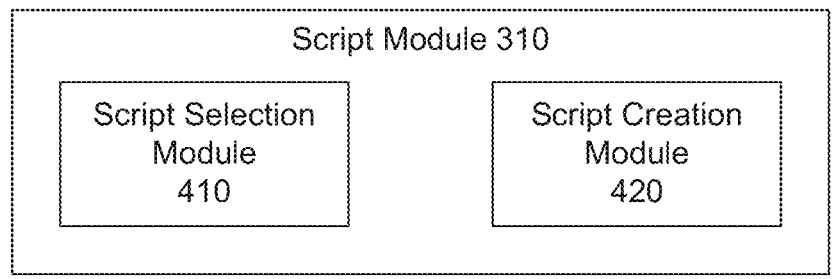
FIG. 4 is a diagram of an example structure of a script module for testing at least one computer application, consistent with embodiments of this disclosure.

By way of example, FIG. 4 is a diagram of an example structure of a script module for testing at least one computer application, consistent with embodiments of this disclosure. In some embodiments, script module 310 in FIG. 3 may include script selection module 410 or script creation module 420.

Where, in some embodiments, script creation module 420 relies on open-source software that assist in creating synthetic scripts. The open-source software used by script creation module 420, may, in some embodiments, include Selenium software, and other software is possible as well. For example, in one embodiment, script creation module 420 uses open-source software (e.g., Selenium) to create at least one synthetic test. In some embodiments, script creation module 420 may be used to schedule (e.g., every fifteen minutes, every thirty minutes, or every sixty minutes) the operation times of at least one or more virtual machines by creating a script. When creating a script some embodiments use a functional automation testing framework (e.g., keyword driven framework) in combination with data files (e.g., Microsoft Excel).

Consistent with some embodiments of this disclosure, script selection module 410 selects a script created by script creation module 420 and automates the selected script. In some embodiments, the script selected by script selection module 410 may automate a synthetic script. In some embodiments, the script selected by script selection module 410 may implement the scheduled operation times (e.g., every fifteen minutes, every thirty minutes, or every sixty minutes) of at least one or more virtual machines. When creating a script some embodiments use a functional automation testing framework (e.g., keyword driven framework) in combination with data files (e.g., Microsoft Excel).

Figure 5:
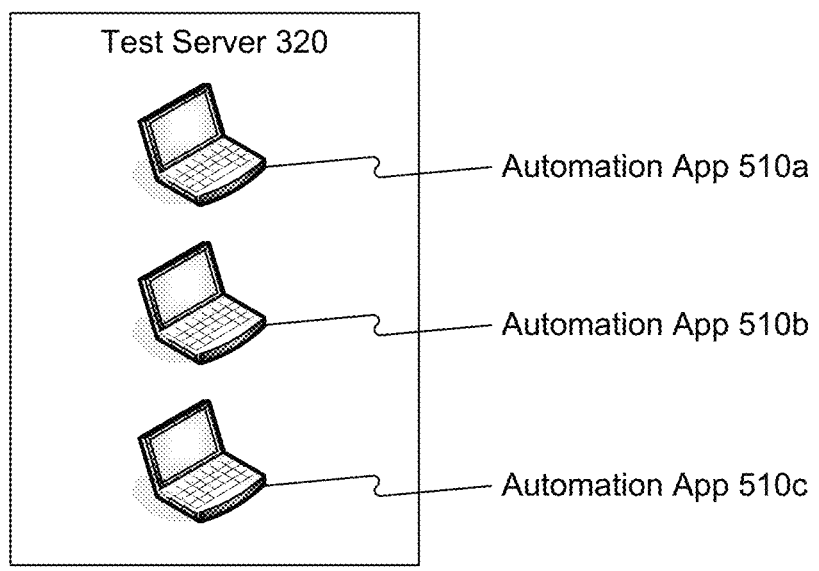
FIG. 5 is a diagram of an example structure of a test module for testing at least one computer application, consistent with embodiments of this disclosure.

By way of example, FIG. 5 is a diagram of an example structure of a test module for testing at least one computer application, consistent with embodiments of this disclosure. In some embodiments, test server 320 in FIG. 3 may perform at least one automation test with at least one automation application. For example, as illustrated in FIG. 5, test server 320 may perform an automation test with automation application 510a, automation application 510b, and/or automation application 510c.

Consistent with some embodiments of this disclosure, test server 320 may perform a first automation test and a second automation test simultaneously. That is, for example, in some embodiments, automation application 510a and automation application 510b may operate simultaneously and in parallel with one another. Likewise, in some embodiments, automation application 510a, automation application 510b, and automation application 510c may operate simultaneously and in parallel with one another. In other embodiments, each of automation application 510a-510c may operate in series.

In other embodiments, testing module 111 in FIG. 1, may reset test server 320. For example, resetting test server 320 may reassign a pending monitoring request 230 to a different automation application to efficiently utilize resources and bandwidth of test server 320. In some embodiments, testing module 111 may reset test server 320 on regular intervals.

To avoid overload of test server 320, some embodiments, may rely on automation applications located in different geographical areas. For example, in one embodiment automation application 510a may be operating on a server in a different time zone than automation application 510b. Thus, in this embodiment, test server 320 may rely on automation application 510a and 510b when 510a is not being fully utilized due to the time zone difference.

Figure 6:
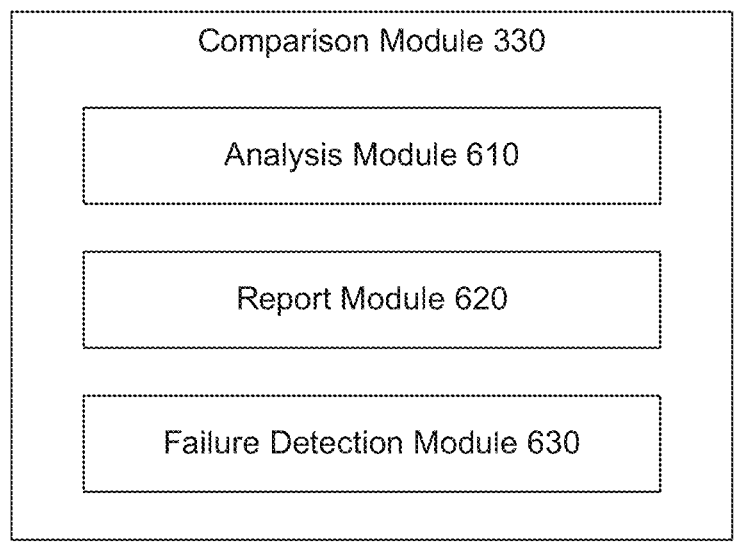
FIG. 6 is a diagram of an example structure of a comparison module for testing at least one computer application, consistent with embodiments of this disclosure.

By way of example, FIG. 6 is a diagram of an example structure of a comparison module for testing at least one computer application, consistent with embodiments of this disclosure. In some embodiments, comparison module 330 in FIG. 3 may include analysis module 610, report module 620, and/or failure detection module 630. For example, analysis module 610 will perform an analysis technique where response data 250 in FIG. 2 is compared to anticipated result. Then, in some embodiments, report module 620 will compile the results of analysis module 610. If the results of response data 250 and the anticipated results are different, then, in some embodiments, the complied results in report module 620 will be transmitted to user 210. In other embodiments, if the results of response data 250 and the anticipated results are the same, the complied results in report module 620 will be transmitted to user 210.

Figure 7:
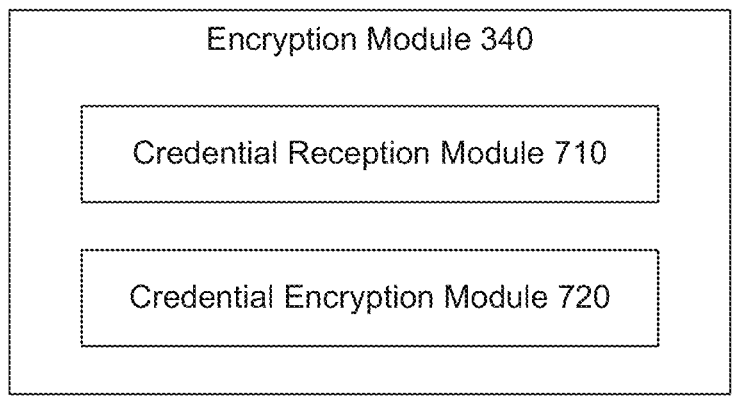
FIG. 7 is a diagram of an example structure of an encryption module for testing at least one computer application, consistent with embodiments of this disclosure.

By way of example, FIG. 7 is a diagram of an example structure of an encryption module for testing at least one computer application, consistent with embodiments of this disclosure. In some embodiments, encryption module 340 in FIG. 3 may include credential reception module 710 and/or credential encryption module 720.

Consistent with some embodiments of this disclosure, credential reception module 710 receives a credential from user 210 in FIG. 2. In other embodiments of this disclosure, credential reception module 710 receives a credential from computer application 220 in FIG. 2. In some embodiments, a credential may be a user identification and/or a user password. In some embodiments, a credential may be used to authenticate and/or authorize a user 210 to access computer application 220.

Upon reception of a credential, in some embodiments, credential encryption module 720 relies on open-source software that assist in encrypting credentials. The open-source software used by credential encryption module 720, may include Selenium software. For example, in one embodiment, credential encryption module 720 uses open-source software (e.g., Selenium) to encrypt at least one credential. In some embodiments, credential encryption module 720 uses a functional automation testing framework (e.g., keyword driven framework) to encrypt the user identification and/or password associated with a computer application (e.g., computer application 220). In other embodiments, credential encryption module 720 uses a functional automation testing framework (e.g., keyword driven framework) to encrypt the user identification and/or password associated with a user (e.g., user 210).

Figure 8A:
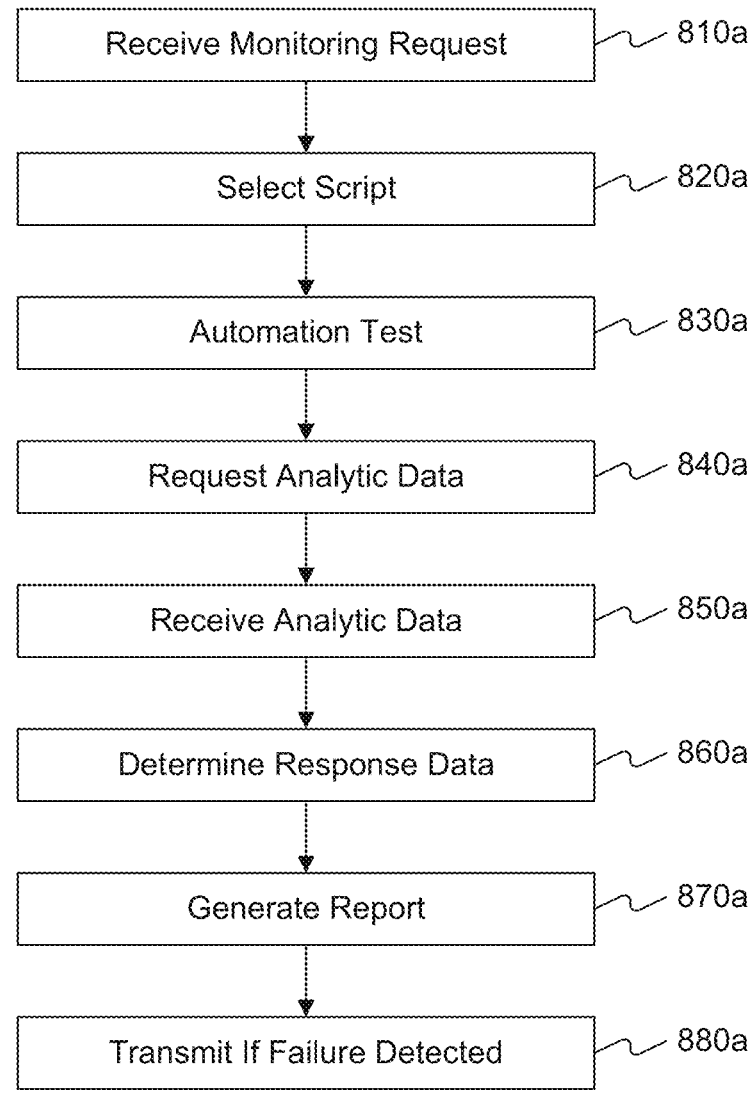
FIG. 8$a$ is a flow diagram involving a testing module in the system shown in FIG. 1 for testing at least one computer application, consistent with embodiments of this disclosure.

By way of example, FIG. 8*a* is a flow diagram involving a testing module in the system shown in FIG. 1 for testing at least one computer application, consistent with embodiments of this disclosure. The system (e.g., server 100 and database 140) may include a memory (e.g., memory 130) that stores instructions and a process (e.g., processor 110) programmed to execute the instructions to implement process 800*a*. For example, process 800*a* may be implemented as one or more software modules (e.g., testing module 111) stored in memory 130 and executable by processor 110.

Referring to FIG. 8*a*, at step 810*a*, the processor may receive from a user (e.g., user 210) a monitoring request (e.g., monitoring request 230). In some embodiments, as discussed above, the user may be, for example, a business provider or a computer operator. In some embodiments, the monitoring request is received at random time intervals. Yet, in other embodiments, the monitoring request is received at periodic scheduled time intervals (e.g., every fifteen minutes, every thirty minutes, or every sixty minutes).

At step 820*a*, the processor may select a script. In some embodiments, the script is a synthetic script. In some embodiments, the processor uses, at least in part, open-source software (e.g., Selenium) to create the script that is selected. When creating a script some embodiments use a functional automation testing framework (e.g., keyword driven framework) in combination with data files (e.g., Microsoft Excel).

At step 830*a*, the processor may perform at least one automation test with at least one automation application. For example, the processor may read the script selected in step 820*a* and operate according to the script. As one example, this may involve creating a synthetic user (e.g., a user account not tied to a human being that simulates data being analyzed) to assist in checking the critical functionality of at least one computer application. In another example, this may involve creating a synthetic user to simulate the performance of at least one computer application.

At step 840*a*, the processor may request analytic data from at least one computer application. In some embodiments, the at least one computer application may be a set of computer programs or processors (e.g., APIs, websites, mobile applications, etc.). In some embodiments, the at least one computer application may be created, maintained, updated, or executed at a server computer of the processor.

At step 850*a*, the processor may receive analytic data associated with the at least one computer application. In some embodiments, the received analytic data may be any output. For example, in some embodiments, the received analytic data may include the response time of the at least one computer application. In other embodiments, the received analytic data may include information regarding the at least one computer application.

At step 860*a*, the processor may determine response data of the at least one computer application by inputting the analytic data to a comparison model determined based on an analysis technique configured to detect a failure by the at least one computer application. In some embodiments, the analysis technique may compare the received analytic data with an anticipated result.

At step 870*a*, the processor may generate a report based on an output of the analysis technique if the failure by the at least one computer application is detected. For example, in some embodiments, the report includes information regarding the at least one computer application or the response time of the at least one computer application.

At step 880*a*, the processor may transmit to the user the report if the failure by the at least one computer application is detected.

Figure 8B:
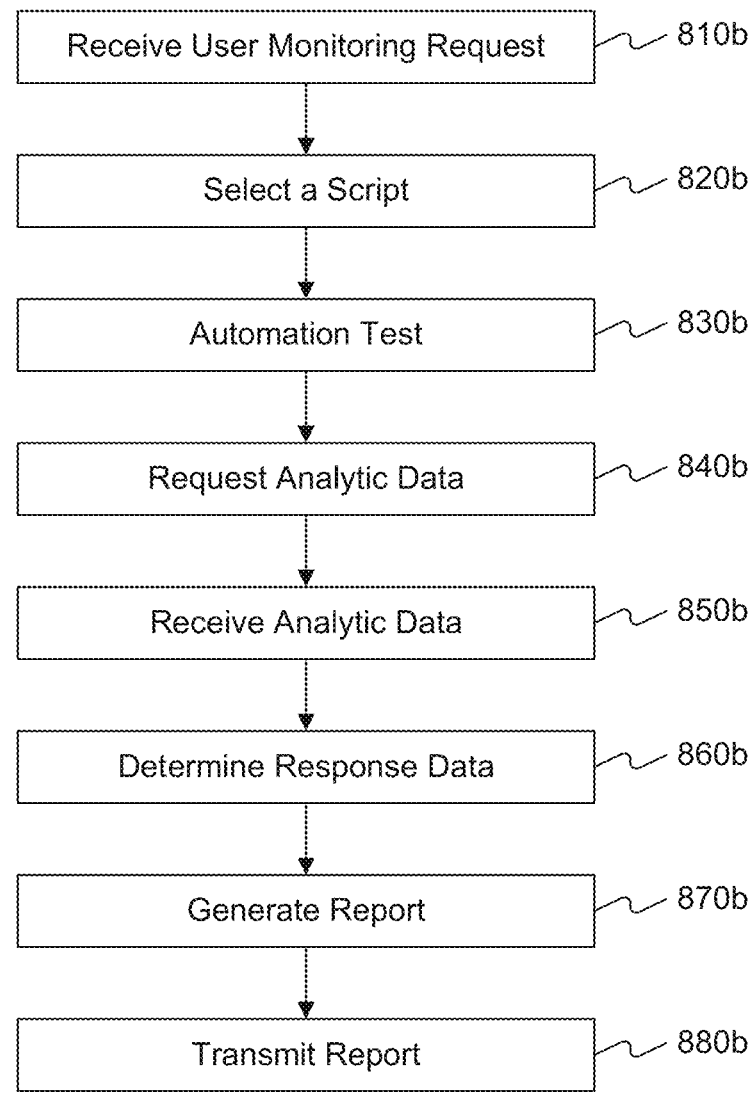

By way of example, FIG. 8*b* is a flow diagram involving a testing module in the system shown in FIG. 1 for testing at least one computer application, consistent with embodiments of this disclosure. The system (e.g., server 100 and database 140) may include a memory (e.g., memory 130) that stores instructions and a process (e.g., processor 110) programmed to execute the instructions to implement process 800*b*. For example, process 800*b* may be implemented as one or more software modules (e.g., testing module 111) stored in memory 130 and executable by processor 110.

Referring to FIG. 8*b*, at step 810*b*, the processor may receive from a user (e.g., user 210) a monitoring request (e.g., monitoring request 230). In some embodiments, as discussed above, the user may be, for example, a business provider or a computer operator. In some embodiments, the monitoring request is received at random time intervals. Yet, in other embodiments, the monitoring request is received at periodic scheduled time intervals (e.g., every fifteen minutes, every thirty minutes, or every sixty minutes).

At step 820*b*, the processor may select a script. In some embodiments, the script is a synthetic script. In some embodiments, the processor uses, at least in part, open-source software (e.g., Selenium) to create the script that is selected. When creating a script some embodiments use a functional automation testing framework (e.g., keyword driven framework) in combination with data files (e.g., Microsoft Excel).

At step 830*b*, the processor may perform at least one automation test with at least one automation application. For example, the processor may read the script selected in step 820*a* and operate according to the script. As one example, this may involve creating a synthetic user (e.g., a user account not tied to a human being that simulates data being analyzed) to assist in checking the critical functionality of at least one computer application. In another example, this may involve creating a synthetic user to simulate the performance of at least one computer application.

At step 840b, the processor may request analytic data from at least one computer application. In some embodiments, the at least one computer application may be a set of computer programs or processors (e.g., APIs, websites, mobile applications, etc.). In some embodiments, the at least one computer application may be created, maintained, updated, or executed at a server computer of the processor.

At step 850b, the processor may receive analytic data associated with the at least one computer application. In some embodiments, the received analytic data may be any output. For example, in some embodiments, the received analytic data may include the response time of the at least one computer application. In other embodiments, the received analytic data may include information regarding the at least one computer application.

At step 860b, the processor may determine response data of the at least one computer application by inputting the analytic data to a comparison model determined based on an analysis technique configured to detect a failure by the at least one computer application. In some embodiments, the analysis technique compares the received analytic data with an anticipated result.

At step 870b, the processor may generate a report based on an output of the analysis technique if the failure by the at least one computer application is detected. For example, in some embodiments, the report may include information regarding the at least one computer application or the response time of the at least one computer application.

At step 880b, the processor may transmit to the user the report if the failure by the at least one computer application is not detected.

A non-transitory computer-readable medium may be provided that stores instructions for a processor (e.g., processor 110) for autonomous testing of a computer application in accordance with the example flowchart of FIG. 8a and/or with example flowchart of FIG. 8b above, consistent with embodiments in the present disclosure. For example, the instructions stored in the non-transitory computer-readable medium may be executed by the processor for performing processes 800a or 800b in part or in entirety. Common forms of non-transitory media include, for example, a floppy disk, a flexible disk, hard disk, solid-state drive, magnetic tape, or any other magnetic data storage medium, a Compact Disc Read-Only Memory (CD-ROM), any other optical data storage medium, any physical medium with patters of holds, a Random Access Memory (RAM), a Programmable Read-Only Memory (PROM), and Erasable Programmable Read-Only Memory (EPROM), a FLASH-EPROM or any other flash memory, Non-Volatile Random Access Memory (NVRAM), a cache, a register, any other memory chip or cartridge, and networked versions of the same.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for testing of at least one computer application, comprising:
a non-transitory computer-readable medium configured to store instructions; and
at least one processor configured to execute the instructions to perform operations comprising:
receiving from a user a monitoring request;
creating a synthetic script configured to simulate a feedback from at least one computer application;
selecting the synthetic script;
generating a synthetic test to simulate the feedback by executing the synthetic script to perform at least one automation test with the at least one automation application;
requesting analytic data from the at least one computer application;
receiving analytic data associated with the at least one computer application;
determining response data of the at least one computer application by inputting the synthetic test and the analytic data to a comparison model determined based on an analysis technique configured to detect a failure by the at least one computer application;
detecting the failure if the synthetic test and the analytic data do not match; and
generating a report based on an output of the analysis technique if the failure by the at least one computer application is detected.

2. The system of claim 1, wherein the monitoring requests are received at random time intervals.

3. The system of claim 1, wherein the at least one processor is further configured to perform operations comprising: receiving a credential from the user, wherein the credential is encrypted.

4. The system of claim 1, wherein the at least one processor is further configured to perform operations comprising: performing a first automation test and a second automation test simultaneously.

5. The system of claim 1, wherein the at least one processor is further configured to perform operations comprising: transmitting to the user the report if the failure by the at least one computer application is detected.

6. The system of claim 1, wherein the at least one processor is further configured to perform operations comprising: transmitting to the user the report if the failure by the at least one computer application is not detected.

7. The system of claim 1, wherein the at least one computer application is further configured to perform operations comprising: at least one application programming interface (API), at least one website, or at least one mobile application.

8. A computer-implemented method for autonomous testing of a computer application, comprising:
receiving from a user a monitoring request;
creating a synthetic script configured to simulate a feedback from at least one computer application;
selecting the synthetic script;
generating a synthetic test to simulate the feedback by executing the synthetic script to perform at least one automation test with the at least one automation application;
requesting analytic data from the at least one computer application;
receiving analytic data associated with the at least one computer application;
determining response data of the at least one computer application by inputting the synthetic test and the analytic data to a comparison model determined based on an analysis technique configured to detect a failure by the at least one computer application;
detecting the failure if the synthetic test and the analytic data do not match; and
generating a report based on an output of the analysis technique if the failure by the at least one computer application is detected.

9. The computer-implemented method of claim 8, wherein the monitoring requests are received at random time intervals.

10. The computer-implemented method of claim 8, wherein the at least one processor is further configured to perform operations comprising: receiving a credential from the user, wherein the credential is encrypted.

11. The computer-implemented method of claim 8, wherein the at least one processor is further configured to perform operations comprising: performing a first automation test and a second automation test simultaneously.

12. The computer-implemented method of claim 8, wherein the at least one processor is further configured to perform operations comprising: transmitting to the user the report if the failure by the at least one computer application is detected.

13. The computer-implemented method of claim 8, wherein the at least one processor is further configured to perform operations comprising: transmitting to the user the report if the failure by the at least one computer application is not detected.

14. The computer-implemented method of claim 8, wherein the at least one computer application is further configured to perform operations comprising: at least one application programming interface (API), at least one website, or at least one mobile application.

15. A non-transitory computer-readable medium configured to store instructions configured to be executed by at least one processor to cause the at least one processor to perform operations, the operations comprising:
receiving from a user a monitoring request;
creating a synthetic script configured to simulate a feedback from at least one computer application;
selecting the synthetic script;
generating a synthetic test to simulate the feedback by executing the synthetic script to perform at least one automation test with the at least one automation application;
requesting analytic data from the at least one computer application;
receiving analytic data associated with the at least one computer application;
determining response data of the at least one computer application by inputting the synthetic test and the analytic data to a comparison model determined based on an analysis technique configured to detect a failure by the at least one computer application;
detecting the failure if the synthetic test and the analytic data do not match; and
generating a report based on an output of the analysis technique if the failure by the at least one computer application is detected.

16. The non-transitory computer-readable medium of claim 15, wherein the monitoring requests are received at random time intervals.

17. The non-transitory computer-readable medium of claim 15, wherein the at least one processor is further configured to perform operations comprising:
receiving a credential from the user, wherein the credential is encrypted.

* * * * *